Patented Dec. 19, 1950

2,534,607

UNITED STATES PATENT OFFICE 2,534,607

MOLDED BRAKE LINING

Frank J. Laher, Orinda, and Cornelius F. Kelleher, Huntington Park, Calif., assignors to Lasco Brake Products Corp., Oakland, Calif., a corporation of California No Drawing. Application July 1, 1948, Serial No. 36,423

2 Claims. (Cl. 260—29.2)

This invention relates generally to molded brake linings such as are suitable for automotive vehicles, and to methods and compositions for their manufacture.

In general it is an object of this invention to provide a method and composition for the manufacture of molded brake linings, which will simplify and generally facilitate factory production, and which will produce a high quality final product.

Another object of the invention is to provide a method making possible cold molding of brake lining composition under pressure, followed by curing without retaining the molded shapes in pressure molds or clamps.

Another object of the invention is to provide a composition and method of the above character which will make it possible to compress the same as a relatively dry mix to a desired physical form and to eliminate use of pressure in the baking or curing operation.

Another object of the invention is to provide a novel composition and method by means of which the coefficient of friction of the final lining can be adjusted to a value desired.

A further object of the invention is to provide a new brake lining having superior properties, including particularly increased strength.

Additional objects of the invention will appear from the following description in which the preferred embodiment of the invention has been set forth in detail.

In the past various mixtures have been prepared for the manufacture of so-called molded brake linings of the type utilized on automotive vehicles. In general these mixtures include a fibrous material such as asbestos, a powdered filling material such as litharge and graphite, and a suitable binder such as a synthetic resin. While the procedures vary in different instances, in general the prepared mixture is molded to the desired final form, and then while being held under pressure in clamps or molds it is heated to an elevated temperature for the so-called curing operation, which produces a final product of desired hardness and density. A serious disadvantage of such conventional methods is the requirement that the body be held under pressure by clamps or molds during the curing operation. This calls for use of elaborate and expensive hydraulic presses and molding equipment during the curing operation and heating problems are complicated.

The present invention is characterized by the use of a novel mix which is capable of being compressed at normal temperatures to the desired final form. Bodies (such as brake lining segments) so formed can be removed from the molds without expansion or change in physical form, and have sufficient inherent strength for handling. To carry out the curing operation, the bodies so formed are passed through a suitable oven, without in any way being subjected to pressure or restraint by the use of clamps or molds. The composition is such that during the baking or curing operation there is no appreciable change in physical form, and in fact there is a slight increase in density. The cured bodies can then be finished to final dimensions as by grinding, and are ready for use without further processing.

A particular feature of our composition is that we make use of a hygroscopic plasticizer for the synthetic resin. This hygroscopic plasticizer is a substance having the properties of diethylene glycol. It is introduced into the original mix or composition as a solution with water, whereby the resulting mixture is moist and is capable of retaining its moisture by virtue of the hygroscopicity of the diethylene glycol. We have found that such a plasticizer makes possible a number of new results which affect both the molding operation and the subsequent curing. These results will be presently explained in detail.

It will be evident from the above that the exact selection of materials and the proportions employed may vary in different instances depending upon the exact type of lining employed and the services for which the lining is intended. However, to state a specific example, the materials employed and the proportions can be as follows:

500 lbs. asbestos fiber
130 lbs. phenol formaldehyde resin powder
130 lbs. litharge
25 lbs. graphite
8 lbs. hexamethylenetetramine
20 lbs. hydrated lime
40 lbs. sulphur
130 lbs. brass chips
15 lbs. diethylene glycol
63 lbs. water On a percentage (by weight) basis the above formula is as follows:

47.1% asbestos fiber
12.3% phenol formaldehyde resin powder
12.3% litharge
2.4% graphite
.8% hexamethylenetetramine 1.9% hydrated lime
3.8% sulphur
12.3% brass chips
1.4% diethylene glycol
5.9% water The asbestos is a fibrous filler which imparts considerable strength to the composition. It is preferable to utilize a high grade material with fairly long fiber. The percentage of this ingredient is not critical, and thus we have found that the amount of asbestos employed can be varied over substantial limits such as from about 40% to 60%.

The phenol formaldehyde resin is a thermal setting synthetic resin. Such resins are known to those skilled in the art. The amount of this resin can be varied between limits of say from about 12% to 25%, depending somewhat upon the particular properties required in the final product.

The litharge is a powdered filler which adds to the specific gravity or density of the final composition. It also tends to combine with the resin to provide a cementing action. The amount of this ingredient can be varied over a range of say from 3 to 15%, or it may be omitted in entirety.

The graphite is a powdered filler and is frequently used in brake lining compositions to impart density, to provide a desired heat conductivity and to adjust the coefficient of friction. In some compositions the amount of graphite may be as low as 2%, or in other compositions incorporating our invention it may be increased to as high as 20%.

The hexamethylenetetramine is a suitable activator for the synthetic resin. It aids in securing thermal setting at the desired critical temperature. In place of this particular material other accelerators known in the art can be employed, as for example furfural and paraformaldehyde. A number of commercial phenol formaldehyde resins which are suitable for use with the invention contain a certain amount of an accelerator like hexamethylenetetramine, and therefore when using such a resin the amount of this ingredient can be reduced or in some instances omitted in entirety. Likewise, the amount of accelerator employed can be reduced in amount or omitted by extending the time period of cure.

The hydrated lime has been found desirable in the preferred compositions, but may be omitted. In our preferred compositions it is desirable to use hydrated lime in amounts ranging from 0.2 to 2%. It aids in neutralizing any acidity of the resin, it functions as a polarizer and it tends to secure greater hardness in the final product.

The sulphur added to the mix should be in powdered form, and serves the useful purpose of speeding up the curing operation. It also combines with the litharge to form lead sulphide which serves to stabilize the friction characteristics of the final product. This ingredient can likewise be omitted in entirety or the amount employed reduced. In the preferred compositions it is desirable to use sulphur in amounts ranging from 1 to 5%.

It is possible to manufacture a useful brake lining composition according to our invention, without the use of metallic particles, such as brass chips. However, brass chips are useful in that they serve to maintain uniform coefficient of friction in the final product, and in addition they serve to polish the brake drums to increase heat conductivity, and increase the strength of the final product. The amounts employed may vary up to about 20%. Various other nonferrous metals can be used in place of brass, excepting, however, copper.

The diethylene glycol is an important ingredient of our composition, and is the hygroscopic plasticizer previously mentioned. Ordinary commercial available forms of diethylene glycol are suitable, and it is mixed with the water to form a diluted solution before its incorporation into the mix. In place of diethylene glycol, it is possible to use other glycols or dihydric alcohols, such as propylene glycol, dipropylene glycol, ethylene glycol, tetraethylene glycol, and derivatives of such glycols. The amount of glycol employed may vary from say 1.2 to 2.5% and the amount of water from say 5.5 to 7%.

In the foregoing specific formula the asbestos fiber constitutes about 47% by weight of the total materials, and about 51% of the non-liquid or solid materials comprising asbestos fiber, phenol formaldehyde resin powder, litharge, graphite, hexamethylenetetramine, hydrated lime, sulphur and brass chips. In general the asbestos fiber constitutes one of the major ingredients and is present to the extent of approximately one-half of the total solid materials (non-liquid). Furthermore, in the above example the combined content of diethylene glycol and water constitutes about 7.3% of the total, and the diethylene glycol alone about 1.4% of the total ingredients. Also the phenol formaldehyde resin is present to the extent of about 12% of the total ingredients, and this amount produces a proper bond upon curing.

As a second example of a specific formula, we have used the following:

250 lbs. (43.6%) asbestos fiber
125 lbs. (21.8%) phenol formaldehyde resin powder
52.5 lbs. (9.1%) brass chips
100 lbs. (17.4%) graphite
35 lbs. (2.0%) water
11.25 lbs. (6.1%) diethylene glycol The above formula produces a brake lining having a substantially lower coefficient of friction than the first formula.

In order to incorporate the above ingredients into a homogeneous mix, the procedure can be as follows: A suitable dough type mixer is employed into which the ingredients can be successively introduced. The asbestos fiber is first placed in the mixer and then the resin powder is introduced. After these ingredients have been intermixed we successively introduce the brass chips, the sulphur and lime, the graphite and the litharge, assuming that the last three ingredients are employed. When these ingredients have been thoroughly intermixed the solution of diethylene glycol is introduced and homogeneously incorporated. Agitation of this mass should be discontinued before lumps commence to appear in the mix.

While the above mix contains considerable moisture it is essentially a divided material which can be handled as a dry mix and stored for long periods of time without material change or deterioration. The moisture content remains substantially constant when exposed to the atmosphere due to the hygroscopic nature of the diethylene glycol.

Assuming that the above mix is to be used in the manufacture of a molded brake lining segment or block, a definite amount of the mix is weighed out, and then introduced into a molding die. A suitable press such as one of the hydraulic type, is utilized in conjunction with a molding die whereby the mass of material is compressed by application of forces comparable to forces customarily used in molding bodies from compounds of the resin containing type.

After being subjected to molding pressure, which requires only a short interval of time, the molded body is removed from the molding die and is ready for the curing operation. The body at this time has considerable inherent strength and it can be readily handled without danger of distortion. It retains the same dimensions and form to which it was pressed in the molding die. If one does not desire to proceed immediately with the curing operation, these formed bodies can be stored indefinitely without deterioration. The moisture content of the material remains substantially constant because of the hygroscopic nature of the diethylene glycol.

The curing operation is carried out by the use of suitable oven equipment having provision for supporting the bodies in spaced relationship, and for subjecting the bodies to heated currents of air. At the commencement of the curing operation the air to which the bodies are subjected has a temperature well below that required for thermal setting of the synthetic resin, as for example a temperature of the order of 180° F. This temperature is maintained for an extended period of time, such as about 24 hours. The first period of the heat treatment serves to evaporate off most of the free water content and to reduce the amount of moisture in the glycol to the order of about 3 or 4%.

After the initial heating period the temperature of the air is gradually increased over a period of about 6 hours, to an elevated temperature such as is capable of thermally setting the synthetic resin, as for example a temperature of the order of 350° F. During the gradual increase in temperature there is a gradual loss of combined water from the resin, which however passes from the resin to the diethylene glycol, and from thence is picked up as water evaporation by the air. During the final period at 350° F. the resin completely sets, and the particles of the mass are bonded together.

Throughout the curing operation no change in form takes place, and there is no tendency to blister or expand. There is a very slight contraction in thickness with resulting increase in density.

In the method described above, the diethylene glycol (or other glycol employed) serves several useful purposes. In the first place, it aids in securing a proper homogeneous mix before molding. In this connection, its presence tends to cause matting of the asbestos fiber instead of too much opening up of these fibers, and this matting effect is secured without causing lumping in the mixture. Opening up of the fibers is detrimental in that it tends to cause an expansion of compressed material after molding under pressure. In the molding operation the presence of diethylene glycol in solution with the water serves to permit equalized flow of the material while under pressure, whereby it tends to flow to all parts of the die or mold and facilitates securing the desired high density. It also aids in securing the desired result of maintaining the prescribed dimensions of the molded body after the pressure is removed.

In the baking or curing operation the diethylene glycol aids in removing the combined water of the synthetic resin during the second and last periods of the oven treatment. As previously pointed out, the combined water of the resin passes to the diethylene glycol, instead of passing directly to the surrounding atmosphere. This transfer of water from the synthetic resin to the diethylene glycol is accompanied by a plasticizing action analogous to a sintering action, which tends to flux or plasticize the synthetic resin to cause the same to wet and bond together the other particles of the mix. It also aids in causing setting of the resin and bonding of the mass without swelling, blistering or warping of any kind.

The curing operation is carried out in such a manner that although a substantial portion of the diethylene glycol is removed by evaporation, a predetermined amount remains in the final composition. For example, it is satisfactory to leave in the final material a quantity of diethylene glycol amounting to about 3 to 5% of that originally introduced. This diethylene glycol in the final material serves to lower the coefficient of friction, and by regulating its amount in the composition, the coefficient of friction can be adjusted to the desired value.

Following the baking or curing operation, the bodies are permitted to cool to normal temperature and then they can be finished to final thickness, as by grinding according to conventional methods.

The final composition resulting from the above procedure has properties making it particularly applicable for use for brake lining. Its strength ranges from 10 to 15% higher than the strength of blocks of comparable thickness made by prior conventional methods. The coefficient of friction can be adjusted to be of a desired value, and friction properties for a given body are maintained to a high degree during various service conditions.

This application is a continuation-in-part of our co-pending application Serial No. 525,442, filed March 7, 1944, now abandoned, and entitled "Molded Brake Lining and Method."

We claim:

1. A moldable material for making rigid molded brake linings characterized by its property of being cold molded under pressure into self-sustaining bodies of substantially final form which are curable by heat without pressure molds or clamps for retaining said form, said material consisting of divided solids and liquid components forming a friable mixture, the solids including asebestos fiber to the extent of substantially one-half of the total solids present together with other powdered filling materials including graphite and metal chips and also including thermal setting resin as a binder, the liquid components being a minor portion of the total ingredients and comprising a glycol selected from a group consisting of ethylene glycol, diethylene glycol, propylene glycol, dipropylene glycol and tetraethylene glycol together with water, the glycol contents ranging from about 1.2 to 2.5% and the water content from 5.5 to 7% of the total mix.

2. A moldable material for making rigid molded brake linings characterized by its property of being cold molded under pressure into self-sustaining bodies of substantially final form which are curable by heat without pressure molds or clamps for retaining said form, said material consisting of divided solids and liquid components forming a friable mixture, the solids including asbestos fiber together with other powdered filling materials including graphite and also including thermal setting resin as a binder, the liquid components being a minor portion of the total ingredients and comprising a glycol selected from a group consisting of ethylene glycol, diethylene glycol, propylene glycol, dipropylene glycol and tetraethylene glycol together with water, the glycol contents ranging from about 1.2 to 2.5% and the water content from 5.5 to 7% of the total mix.

FRANK J. LAHER.
CORNELIUS F. KELLEHER.

REFERENCES CITED

The following references are of record in the file of this patent:

UNITED STATES PATENTS

| Number | Name | Date |
|---|---|---|
| 1,358,394 | Redman et al. | Nov. 9, 1920 |
| 1,508,124 | Richardson | Sept. 3, 1924 |
| 1,989,243 | Nash et al. | Jan. 29, 1935 |
| 2,190,605 | Moore | Feb. 13, 1940 |

FOREIGN PATENTS

| Number | Country | Date |
|---|---|---|
| 413,628 | Great Britain | Oct. 15, 1932 |

OTHER REFERENCES

Pages 13 and 15, Synthetic Organic Chemicals, Carbide and Carbon Chemical Corp., 10th edition, October 15, 1940.